(No Model.)　　　　　　　　　　　　　　　　6 Sheets—Sheet 1.
T. MIDGLEY.
APPARATUS FOR ANNEALING, CLEANING, AND GALVANIZING OR PLATING WIRE, WIRE RODS, &c.
No. 279,580.　　　　　　　　　　Patented June 19, 1883.
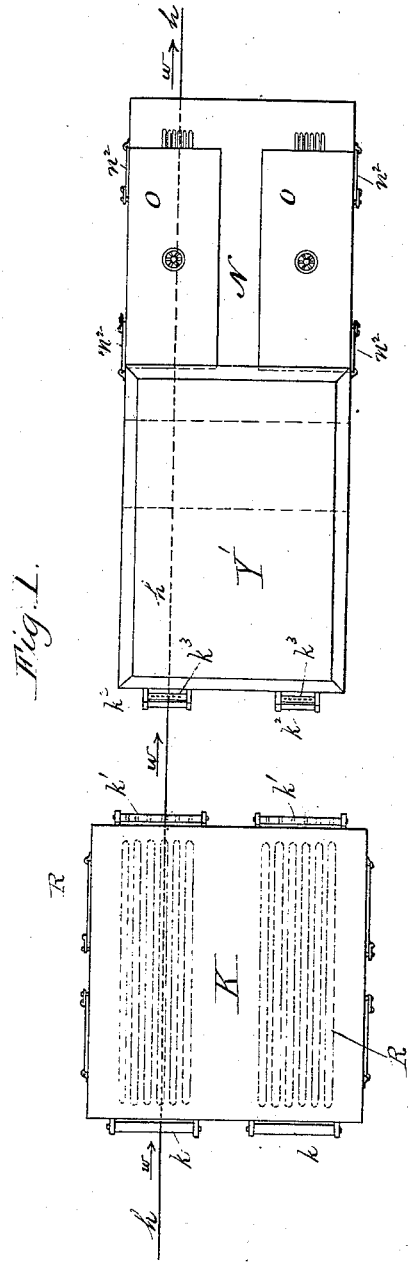
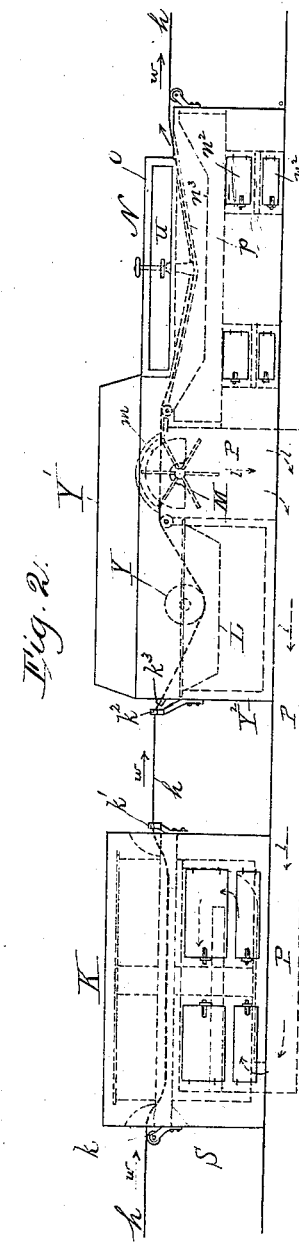
Witnesses;
Albert A. Barker.
Walter B. Nourse.
Inventor;
Thomas Midgley.
N. PETERS, Photo-Lithographer, Washington, D. C.

(No Model.) 6 Sheets—Sheet 2.
T. MIDGLEY.
APPARATUS FOR ANNEALING, CLEANING, AND GALVANIZING OR PLATING WIRE, WIRE RODS, &c.
No. 279,580. Patented June 19, 1883.
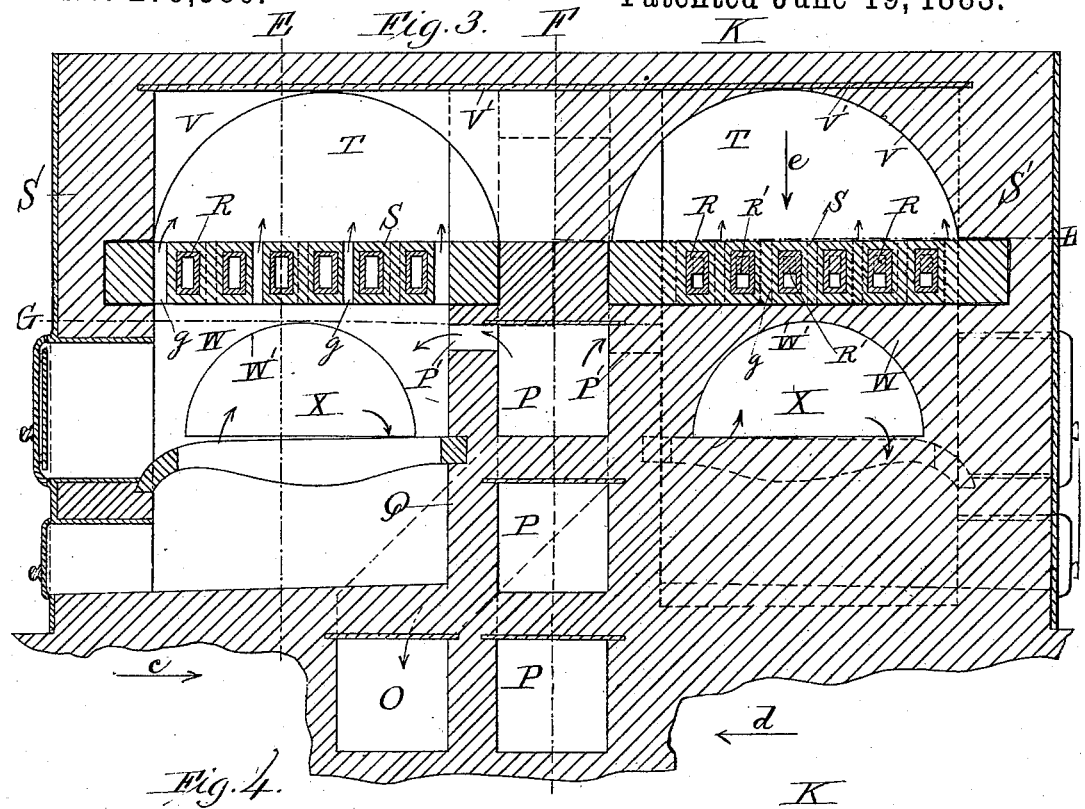
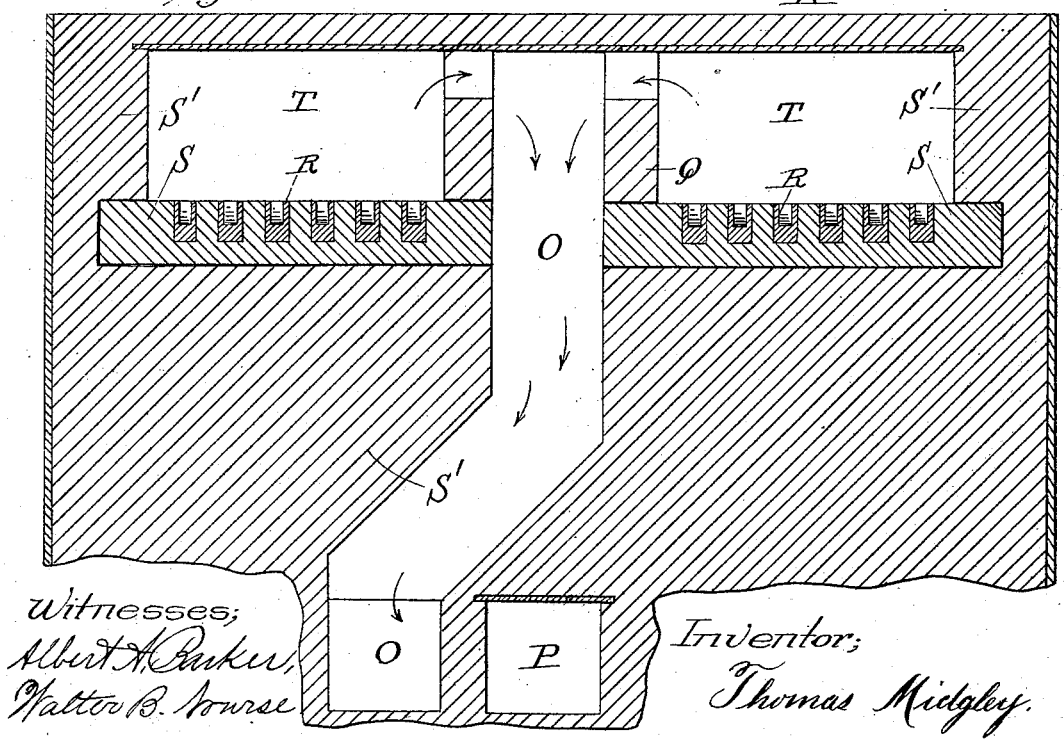
Witnesses;
Albert H. Parker
Walter B. Nourse
Inventor;
Thomas Midgley.
N. PETERS, Photo-Lithographer, Washington, D. C.

(No Model.) 6 Sheets—Sheet 3.
T. MIDGLEY.
APPARATUS FOR ANNEALING, CLEANING, AND GALVANIZING OR PLATING WIRE, WIRE RODS, &c.
No. 279,580. Patented June 19, 1883.
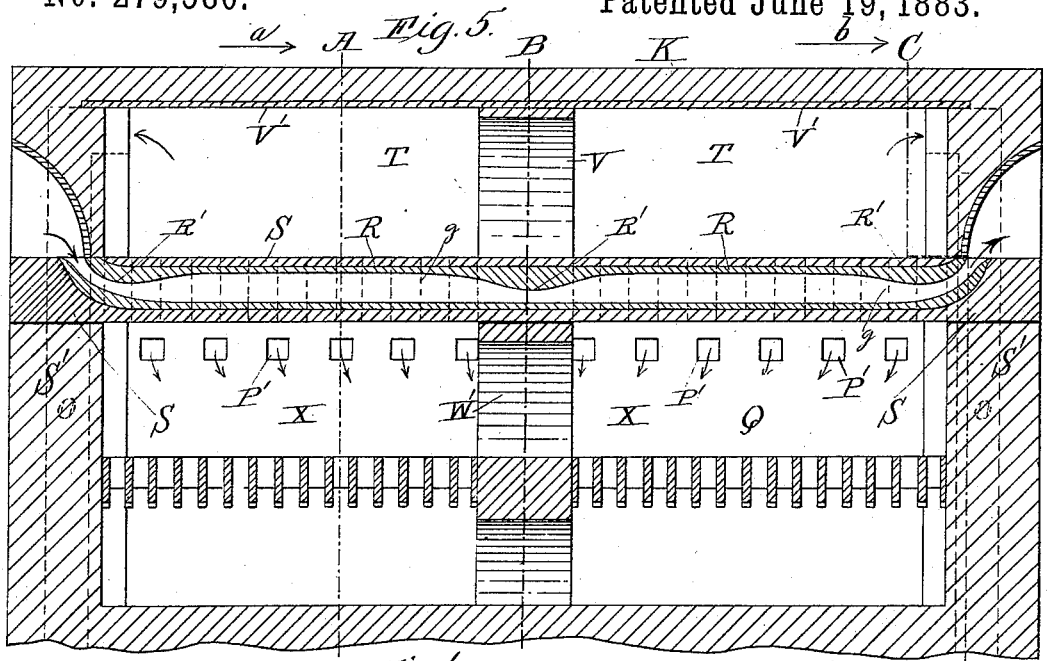
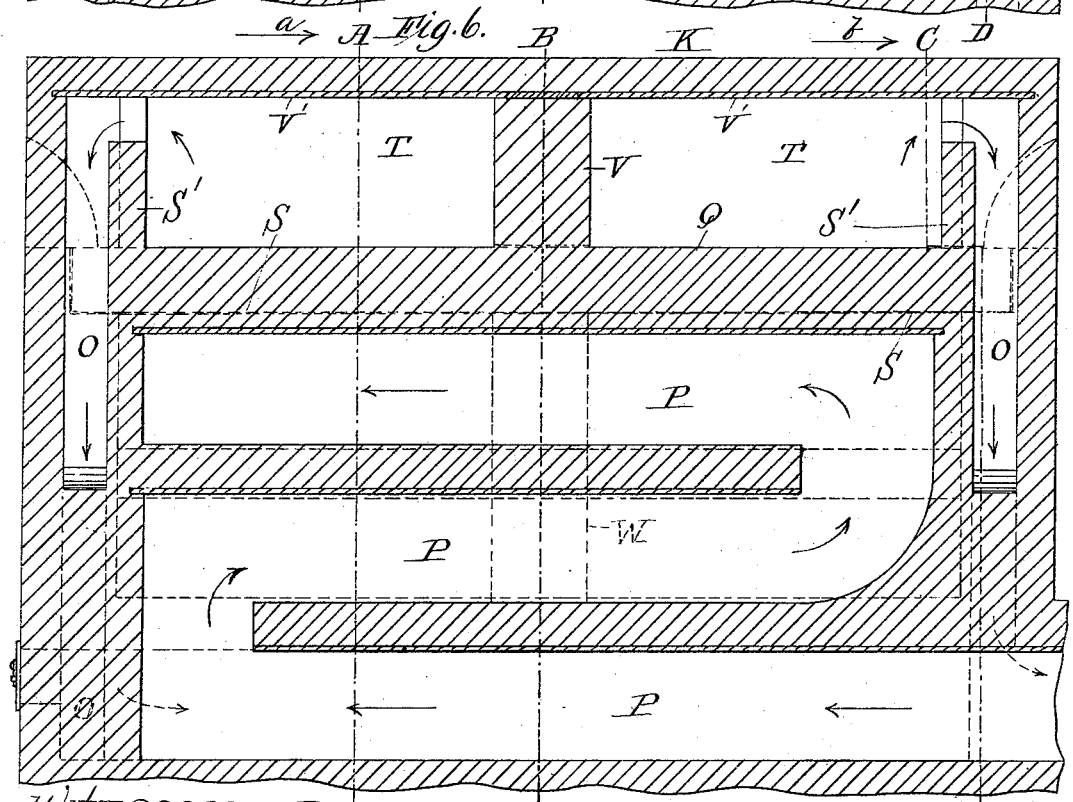
Witnesses:
Albert A. Barker.
Walter B. Nourse.
Inventor:
Thomas Midgley.

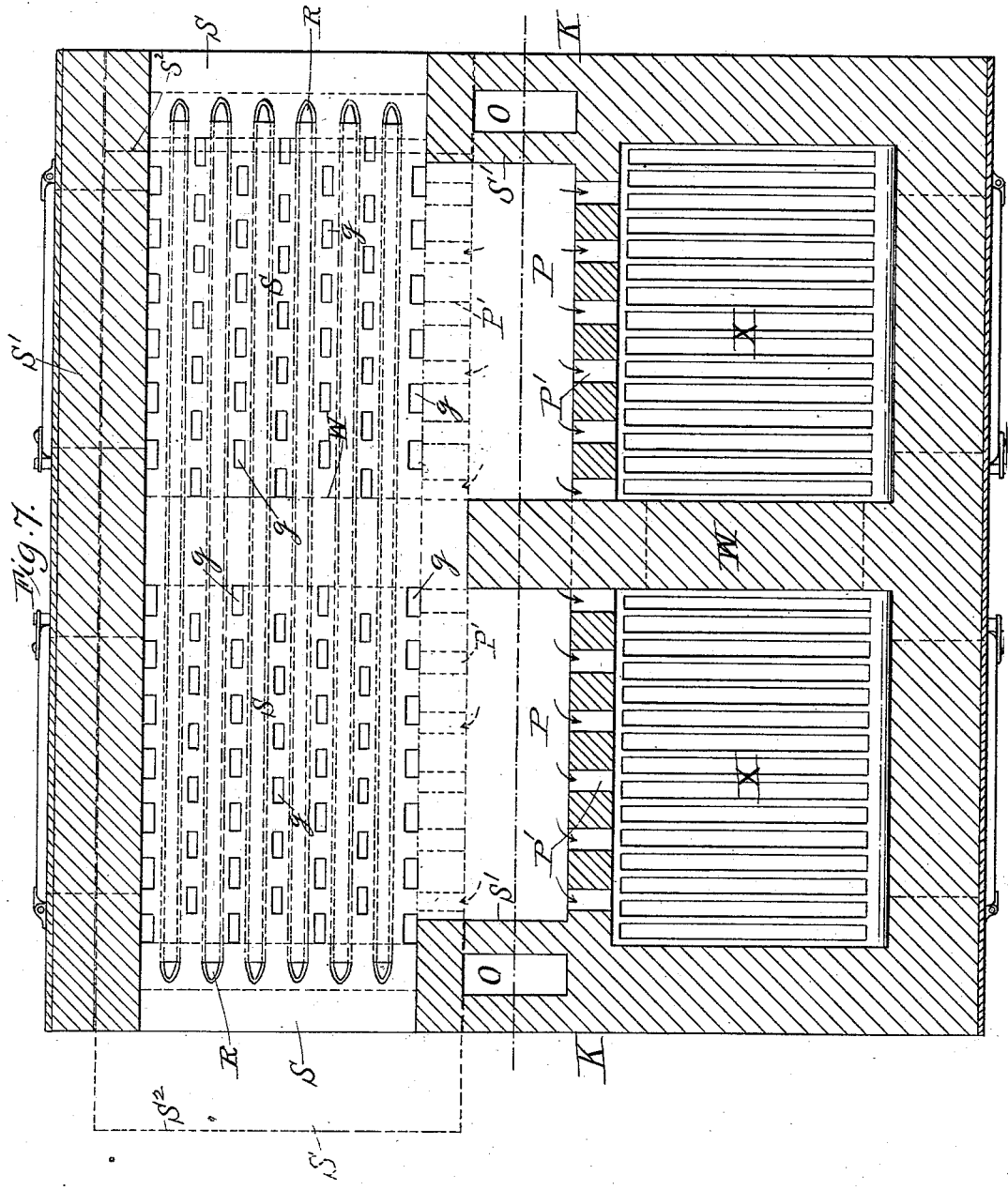

(No Model.) 6 Sheets—Sheet 5.

T. MIDGLEY.
APPARATUS FOR ANNEALING, CLEANING, AND GALVANIZING OR PLATING WIRE, WIRE RODS, &c.

No. 279,580. Patented June 19, 1883.

Witnesses;
Albert A. Barker,
Walter B. Nourse.

Inventor;
Thomas Midgley.

(No Model.) 6 Sheets—Sheet 6.
T. MIDGLEY.
APPARATUS FOR ANNEALING, CLEANING, AND GALVANIZING OR PLATING WIRE, WIRE RODS, &c.
No. 279,580. Patented June 19, 1883.
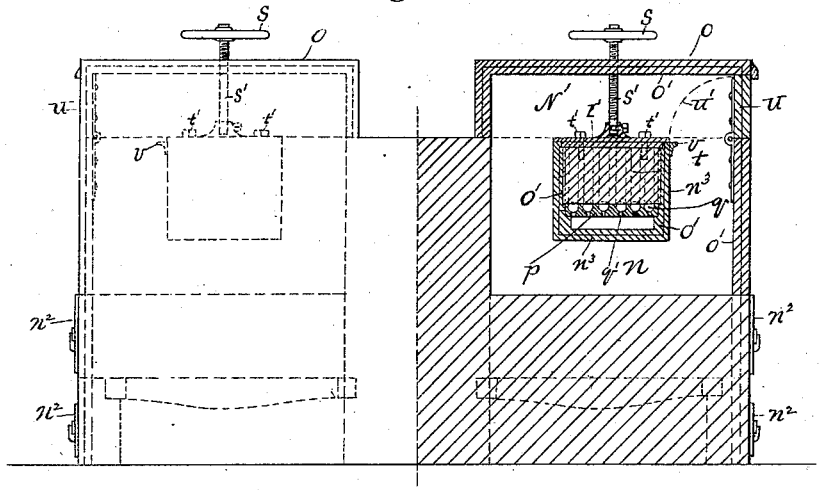
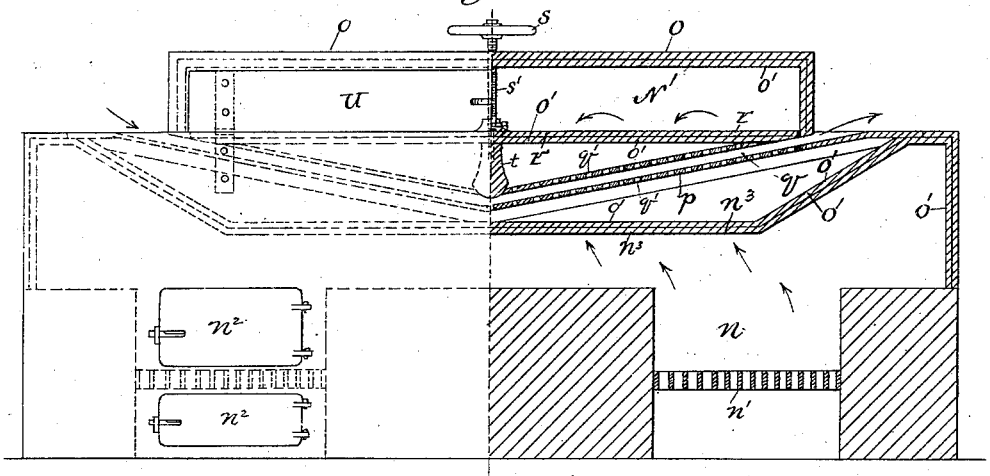
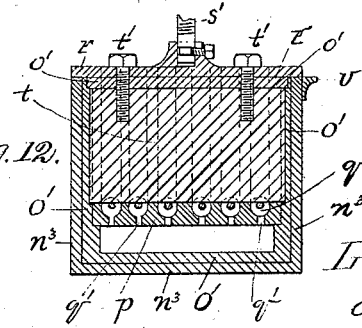
Witnesses;
Albert A. Barker
Walter B. Nourse.
Inventor;
Thomas Midgley.
N. PETERS. Photo-Lithographer. Washington, D. C.

UNITED STATES PATENT OFFICE.

THOMAS MIDGLEY, OF WORCESTER, MASSACHUSETTS.

APPARATUS FOR ANNEALING, CLEANING, AND GALVANIZING OR PLATING WIRE, WIRE RODS, &c.

SPECIFICATION forming part of Letters Patent No. 279,580, dated June 19, 1883.

Application filed March 26, 1883. (No model.)

*To all whom it may concern:*

Be it known that I, THOMAS MIDGLEY, of Worcester, in the county of Worcester and State of Massachusetts, have invented an Improved Apparatus for Annealing and Galvanizing or Plating Wire, Wire Rods, or Strips of Metal; and I do hereby declare that the following is a full, clear, and exact description of the same, reference being had to the accompanying drawings, forming a part of this specification, and in which—

Figure 8:
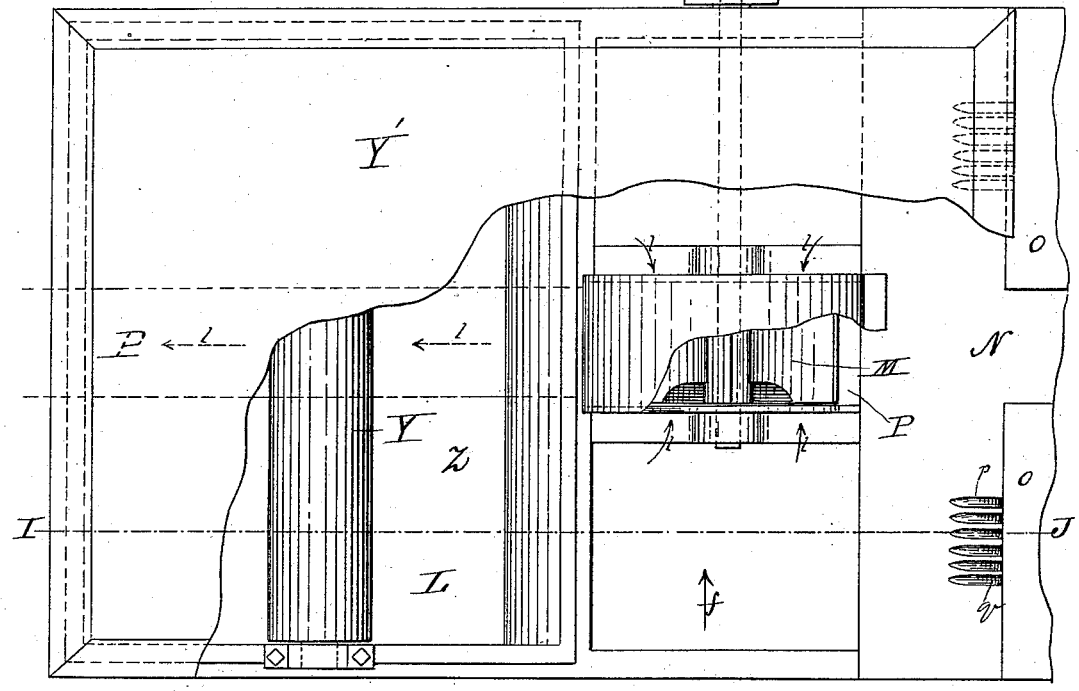
Figure 9:
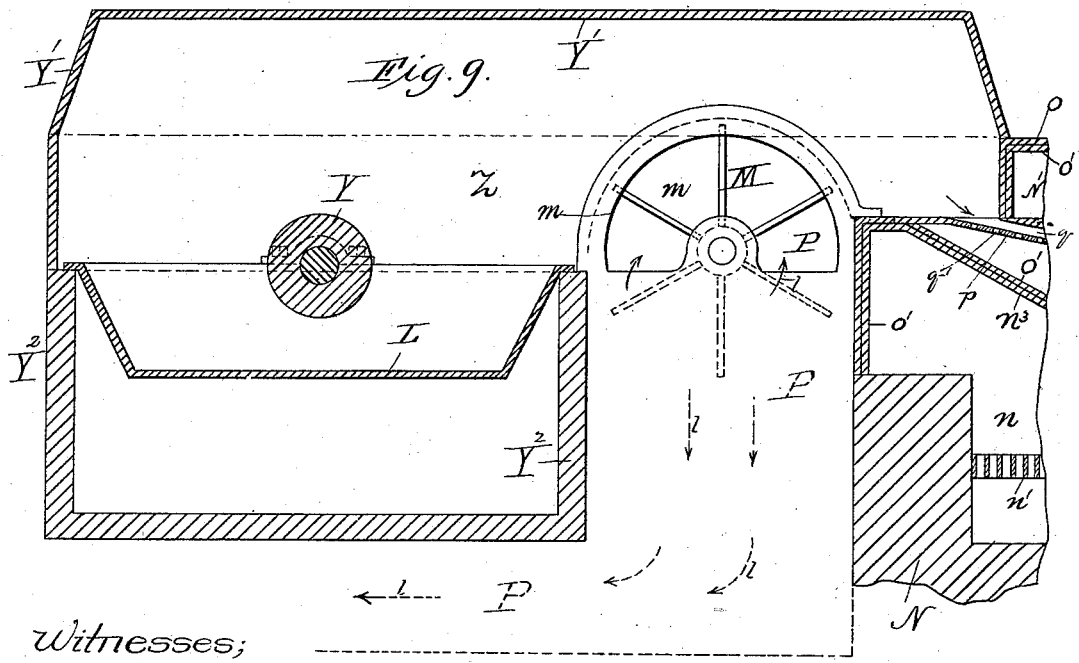

Figure 1 represents a top or plan view, and Fig. 2 a side view, of an apparatus for annealing, cleaning, and galvanizing or plating wire or wire rods with my improvements applied thereto. All of the succeeding figures represent enlarged views of different portions of the apparatus shown in Figs. 1 and 2. Fig. 3 represents a cross-section through the annealing-furnace of the apparatus, the left-hand half being a section taken at the point indicated by lines A, Figs. 5 and 6, and the right-hand half at the point indicated by lines B of said figures, both looking in the direction of arrows $a$. Fig. 4 represents a cross-section through the annealing-furnace, taken at the point indicated by lines C D, Figs. 5 and 6, looking in the direction shown by arrows $b$. Fig. 5 represents a longitudinal section through the annealing-furnace, taken at the point indicated by line E, Fig. 3, looking in the direction of arrow $c$. Fig. 6 represents a longitudinal section through the annealing-furnace, taken at the point indicated by line F, Fig. 3, looking in the direction of arrow $d$. Fig. 7 represents a horizontal section through the annealing-furnace, taken at the point indicated by line G H, Fig. 3, looking in the direction of arrow $e$. Fig. 8 represents a top or plan view of the acid-tank, fan-wheel, and covering over said parts, the latter being partly broken away to show the tank and fan-wheel more clearly, one end of the galvanizing or plating tank and furnace also being shown in said figure. Fig. 9 represents a vertical section through the parts shown in Fig. 8, taken on line I J of said figure, looking in the direction of arrow $f$. Figs. 10 and 11 represent an end view and side view, respectively, upon the left-hand side of said figures, of the galvanizing or plating tank and furnace, and upon the right-hand side a cross-section and longitudinal section of the same; and Fig. 12 represents an enlarged view of a portion of the cross-section shown in Fig. 11, which will be hereinafter more fully described.

To enable those skilled in the art to which my invention belongs to make and use the same, I will proceed to describe it more in detail.

In the drawings, K represents the annealing-furnace; L, the acid-tank; M, the fan-wheel, and N the galvanizing or plating furnace.

The annealing-furnace K is constructed and arranged in the following manner: In this instance it is represented in the drawings as a double furnace, and the cleaning and galvanizing or plating portions of the apparatus also made double to correspond therewith The fire-boxes, grates, and working-doors are constructed and arranged substantially in the usual way, and the furnace also provided with outlet-flues O O at each end, for carrying off the smoke and other products of combustion. In addition to these old parts before mentioned, I form a flue, P, in the division-wall or partition Q between the two furnaces, and extend it to the acid cleaning-tank, as hereinafter described. The purpose of this flue is to conduct the acid-fumes produced by the cleaning operation to the fire in the furnace to be burned. As the acid fumes are generated in the cleaning-bath, and are attracted by the heat of the furnace, and forced toward said furnace by the fan-wheel, (hereinafter described,) they pass out of the flue P through suitable openings, P', (see Figs. 3, 5, and 7,) as shown by arrows, and enter the fire-box of the furnace, where they are entirely burned and pass off as smoke through the smoke-flues before described.

By arranging the acid-flue P in a central partition between the two fire-boxes, as before described, and extending it back and forth in said partition, as shown in Fig. 6, I am enabled by the intense heat of the furnace to produce a strong, steady draft to attract the acid-fumes from the cleaning-bath to said furnace, and this draft is greatly exhilarated by the fan-wheel, hereinafter described.

The wire, wire rods, or strips of metal to be annealed are passed through conducting-tubes R, which are arranged in the parts S. Said parts S not only serve as supports for the tubes, but to protect the same from direct contact with the fire. In practice the tubes would be nearly filled with molten lead, or similar annealing material, for the wire or strips of metal to pass through. They are held at about the center of the tubes as they pass through by the curved projections R', (see Fig. 5,) which projections also enable the wires or strips to pass through with but little friction by holding them away from the top surface of said tubes.

The parts S are provided with vertical openings g, (see Figs. 3 and 7,) for allowing the fire to pass upward from the fire-boxes to the chamber T, above said parts S, and tubes R, which extends over the whole upper part of the furnace. The roof or covering of the furnace may be supported upon arches V and metal plates V', as in the present instance, or in any other suitable manner. The parts S are supported in the outer walls, S', upon the central division-partition, Q, and upon partitions W under the center of each part, which are arched, as shown at W', to form one continuous chamber, X, under said parts S, upon each side of the partition Q. By thus constructing and arranging the interior of the annealing-furnace, a strong and uniform heat is produced upon all sides of the annealing-tubes R, thereby admitting of the wires, wire rods, or strips being annealed in a very perfect manner. In practice the pipes R would be made of suitable cast metal and the parts S of fire-brick or similar non-combustible material. The tubes would be cast in halves, and when placed together embedded in fire-clay or similar material placed in the proper-shaped mold. The molded clay, with the tubes embedded in the same, would then be burned in the usual way. Any other method of embedding the tubes in a non-combustible material similar to this may be employed, if preferred, and the shape of the tubes and parts S may be made of any other desired shape than that shown in the drawings. Said parts S are in practice made adjustable, being fitted loosely in the furnace, so that they may be easily removed at any time, when they require renewal, by pulling them endwise out of said furnace, as shown by dotted lines S² in Fig. 7, which represents one of the parts as being partly drawn out at one end; and they may be provided with a greater or less number of tubes R and vertical openings g than shown in the drawings, if desired. The number of openings P' in partition Q, for the passage of the acid-fumes from flue P to the chambers X X, may also be varied.

The wires, wire rods, or strips of metal h (see Figs. 1 and 2) to be annealed are guided in entering the annealing-tubes R over the guide-rolls k, and as they leave the opposite end, by passing through suitable guide-plates, k', provided with openings for the same, or by rolls properly arranged to guide them to the guides k² of the cleaning apparatus.

That part of the apparatus used for cleaning the wire or strips is constructed and arranged, with few exceptions, in the usual way, with the tank L, for containing the proper cleaning-acid, stone roll Y, for keeping said wires or strips in the acid as they pass through, and covering Y' over said parts.

My improvements consist in conducting the acid-fumes (generated by the contact of the hot metal with the acid in tank L) through the acid-flue P, before described, to the annealing-furnace K, and there burned, as also before described. Said improvements also consist in combining with the end of the acid-flue P next to the cleaning apparatus a fan-wheel, M, whereby the acid-fumes may be drawn into the flue P and forced forward, as shown by arrows l in Figs. 8 and 9, so as to be more readily attracted by the heat contained in the annealing-furnace. The end of flue P next to the cleaning apparatus is closed up, with the exception of the proper size of openings m required to produce a good suction when the fan-wheel is in operation.

If preferred, the position of the fan-wheel M may be varied and the openings m also correspondingly varied; and instead of only one fan-wheel being used, as shown in the drawings, two or more, or a sufficient number to produce the required draft, may be combined with any part of the acid-conducting flue P between the cleaning apparatus and annealing-furnace.

It will be understood that by the use of my improvements the chamber Z between the acid-tank and cover Y' is made perfectly tight, or as tight as possible. There being no exit for the acid-fumes, except through the flue P, to the annealing-furnace, therefore it will be seen that by the aforesaid construction and arrangement I am enabled to consume all the acid-fumes generated by the cleaning operation, and thus obviate one of the most serious and objectionable features to the present apparatuses in public use. Then, again, by conducting the acid-fumes (which consist, principally, of hydrogen and chlorine gases) to the annealing-furnace the combustion in the same is greatly increased thereby, consequently enabling a saving in fuel.

The covering Y' is extended over the galvanizing or plating furnace N, as shown in Figs. 1, 2, 8, and 9, so as to prevent the escapement of the acid-fumes in passing the wires or strips from the acid to the galvanizing or plating bath, and to prevent such escapement where they enter as far as is possible, I pass them through tubes k³, formed upon or fastened to the covering Y', or to the tank Y², which contains the water or other cooling-liquid under the acid-tank L.

The fan-wheel M may be driven by connection with any suitable and convenient mechanism.

The galvanizing or plating furnace N is constructed and arranged in the following manner:

It is provided with the usual fire-boxes, $n$, grates $n'$, working-doors $n^2$, and galvanizing or plating tank $n^3$. The furnace N and tank $n^3$ are provided with a cover, $o$, and said tank, cover, and furnace coated and lined with fire-brick $o'$ or similar material.

Instead of passing the wires, rods, or strips of metal through the coating material in an open tank, as in the usual way, I arrange in each tank an inclined part, $p$, (see Figs. 10, 11, and 12,) which is provided with longitudinal openings $q$ for the passage of the wires, rods, or strips, and by which the latter are guided in passing through, thus preventing any entanglement of the same.

Openings $q'$ are formed through the parts $p$, to allow the coating material to surround the wires, rods, or strips, and also to allow it to pass up through, so that it may be skimmed from the top when required.

The tank $n^3$ is provided with an adjustable cover, $r$, which may be raised and lowered, as required, (for the purpose of skimming off such dross as may collect upon the surface of the coating material,) by means of a hand-wheel, $s$, which is connected with said cover by means of a vertical screw-shaft, $s'$.

In order to prevent friction of the wires or strips in passing through the openings $q$ by bearing upon the upper sides of said openings, a bearing-piece, $t$, made in this instance of stone, is fastened by means of bolts $t'$ $t'$ to the adjustable cover $r$, which may be raised with said cover when it is raised for the purpose before described, or left in its position, as shown in Figs. 10, 11, and 12, by removing the holding-bolts $t'$ $t'$.

Access is obtained to the chambers N' around the tanks $n^3$ to remove said bolts $t'$, and to skim off the coating material, as required, by arranging a door, $u$, in the front side of each side of the furnace, which is hinged at the bottom to swing in, as shown by dotted line $u'$ in Fig. 10. The edges of the doors rest, when swung into a horizontal position, upon the flanges or ledges $v$, formed on the upper edges of the tanks $n^3$.

In practice I propose to make the wire-guiding parts $p$ of fire-brick, cement, or similar material which will resist the action of the coating material.

By the foregoing construction and arrangement of the galvanizing or plating furnace I am enabled to apply heat, as in the annealing-furnace, entirely around the metal being treated, thereby obtaining a strong and even heat, which prevents the coating material from oxidizing. This is especially of advantage when using zinc in galvanizing, which is by far the most extensively used in coating wire, wire rods, or flat strips of metal for fencing and other purposes.

It is a well-known fact that zinc and other similar coating materials are very quickly and rapidly oxidized by exposure to cold air when heated to a liquid or molten state, and this rapid oxidation, caused by the use of the present open-topped furnaces, (which do not provide for a covering over the coating-bath, or enable the heat to be applied except at the bottom and sides of the tank,) is a source of great expense, the loss by the formation of surface and slab dross being many tons each day in a large manufactory of wire and similar products in which I am interested, and which I know to be the fact from personal observation and practical experience in said manufacturing establishment.

Another great objection to the present method of galvanizing or plating, in addition to the above, is that the coating material, being heated only at the bottom and sides, is unevenly heated, that at the bottom being heated much in excess of that at the surface or top of the tank, which is injurious, not only to the coating material, but to the wire or other metal being treated as well.

I am enabled by forming a fire-chamber, N', around the coating-bath, as before described, and shown in the drawings, to obtain an even and uniform heat, as before stated, thus economizing largely in gas or other heating medium over the old methods employed.

By making the bearing parts $t$ of stone, the inclined guiding parts $p$ of fire-brick or similar material, and also coating the inside of the kettles or tanks $n^3$ and adjustable covers $r$ with fire-brick or a similar non-combustible material, as before described, it will be seen that such parts will require renewal only at long intervals.

The kettles or tanks as now used, and bearing parts, which are usually made of cast-iron, have to be renewed at short intervals, thereby causing a large outlay of unnecessary expense, whereas by covering such parts, as aforesaid, with a coating, $o'$, they are effectually protected from injury by either the fire or the action of the zinc or other plating material.

Although I prefer to use the galvanizing or plating part of my apparatus in combination with the other parts of the apparatus, as hereinbefore described, it may be used with other similar kinds of apparatuses with good results.

In Figs. 1 and 2 I have represented, by full and dotted lines, the passage of one strand of wire, $h$, through my improved apparatus, the course of said strand of wire being indicated by arrows $w$.

Having described my improved apparatus for annealing, cleaning, and galvanizing or plating wire, wire rods, or strips of metal, what I claim therein as new and of my invention, and desire to secure by Letters Patent, is—

1. The combination, with an annealing-furnace, K, and acid-tank L, provided with a tight cover, Y', of a conducting-flue, P, substantially as and for the purpose set forth.

2. The combination, with furnace K, of the central partition, Q, provided with conducting-flue P and openings P', substantially as and for the purposes set forth.

3. The combination, with the acid-tank L, provided with tight cover Y', and the flue P, for conducting the acid-fumes from the acid bath to the fire-chambers X of the annealing-furnace K, of fan-wheel M, substantially as and for the purpose set forth.

4. The combination, with the annealing-furnace K, of the adjustable parts S, provided with vertical openings $g$, and annealing-tubes R, substantially as and for the purposes set forth.

5. The combination, with the acid-tank L, provided with the cover Y', flue P, and fan-wheel M, of galvanizing or plating furnace N, provided with kettle or tank $n^3$, cover $o$, inclined part $p$, adjustable cover $r$, stone bearing-piece $t$, hand-wheel $s$, screw-shaft $s'$, and hinged door $u$, substantially as and for the purposes set forth.

6. The combination, with the galvanizing or plating furnace N and kettle $n^3$, provided with cover $o$, and coating $o'$, of inclined part $p$, provided with longitudinal and vertical openings $q\,q'$, adjustable cover $r$, provided with coating $o'$, bearing part $t$, screw-shaft $s'$, hand-wheel $s$, and hinged door $u$, substantially as and for the purposes set forth.

7. The combination, with the kettle $n^3$ and cover $o$ of the galvanizing or plating furnace N, of adjustable cover $r$, screw-shaft $s'$, and hand-wheel $s$, or their equivalents, substantially as and for the purposes set forth.

8. The combination, with the furnace N, cover $o$, and kettle $n^3$, provided with flange $v$, of the hinged door $u$, substantially as and for the purpose set forth.

9. The combination, with the kettle $n^3$, provided with coating $o'$, flange $v$, adjustable cover $r$, and bearing part $t$, of inclined guiding part $p$, provided with longitudinal and vertical openings $q\,q'$, substantially as and for the purposes set forth.

10. The combination of the kettle $n^3$, provided with coating $o'$, with cover $o$, also provided with coating $o'$, substantially as shown and described.

THOMAS MIDGLEY.

Witnesses:
ALBERT A. BARKER,
WALTER B. NOURSE.